3,300,261
FULL COMPLEMENT ROLLER RADIAL THRUST BEARING
Carl F. Benson, Torrington, Conn., assignor to The Torrington Company, Torrington, Conn., a corporation of Maine
Filed Mar. 3, 1964, Ser. No. 349,124
1 Claim. (Cl. 308—212)

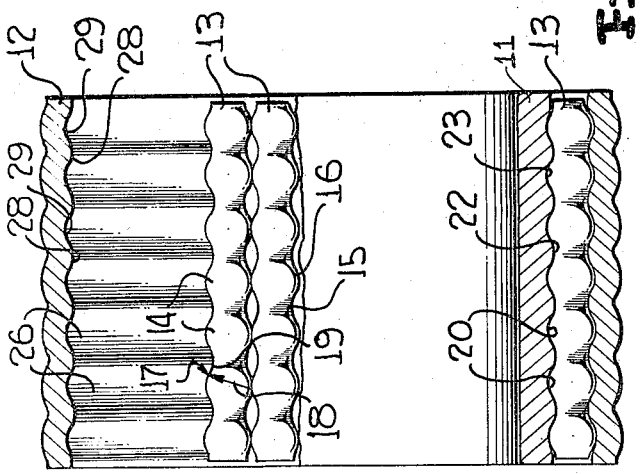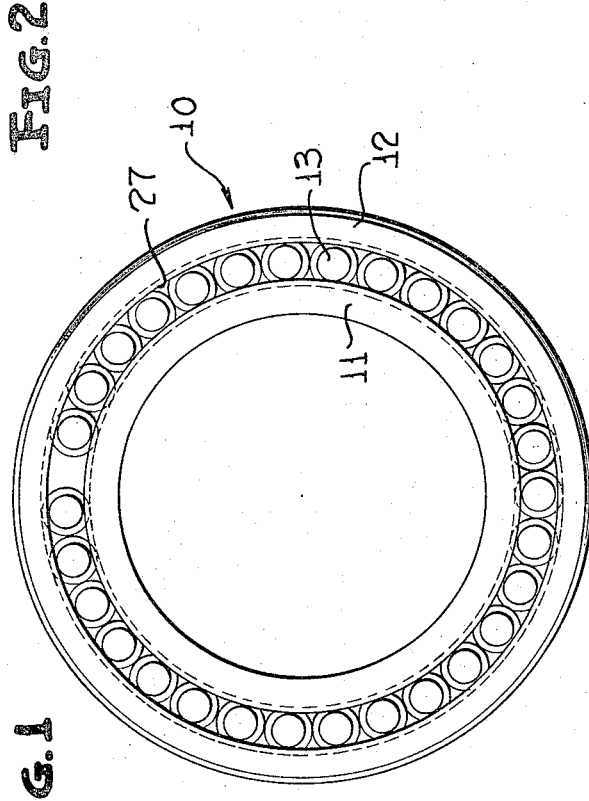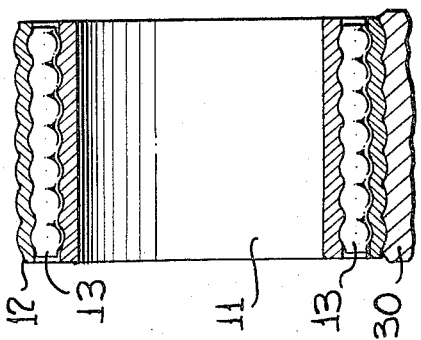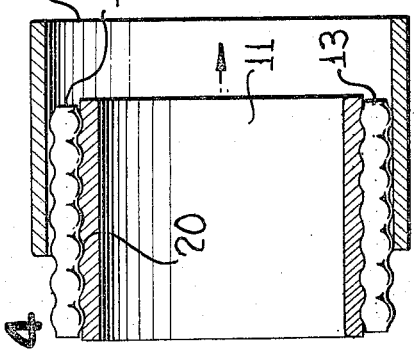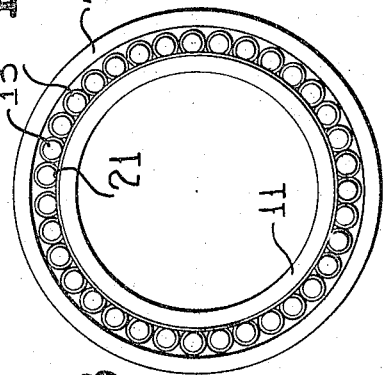
INVENTOR
CARL F. BENSON

This invention relates to a beaded roller radial thrust bearing assembly and more particularly to a full complement roller bearing assembly which is designed to support radial and axial loads.

Various types of bearing assemblies have been previously devised which are capable of taking both radial and thrust loads. It is an object of this invention to provide a bearing assembly which includes inner and outer races and employs a full complement of beaded rollers as the rolling elements between the inner and outer races.

Another object of this invention is to provide a bearing assembly consisting of an outer race, an inner race, and a full complement of beaded rollers disposed between the outer race and the inner race.

Another object of this invention is to provide a bearing assembly employing a thin drawn outer race forming shell member for cooperating with a plurality of beaded rollers each having a series of uniformly spaced nodes formed by alternating concave and convex portions.

Another object of this invention is to provide a full complement roller radial thrust bearing assembly comprising an outer race and an inner race, a full complement of beaded rollers disposed between the outer and inner races, and the inner race having an outer surface with grooves formed therein for cooperating with the beaded rollers.

Another object of this invention is to provide a full complement roller radial thrust bearing assembly comprising an outer race and an inner race, a full complement of beaded rollers disposed between the outer and inner races, and the outer race having an inner surface with grooves formed therein for cooperating with the beaded rollers.

Another object of this invention is to provide a bearing assembly, of the type set forth above, wherein the outer race comprises a thin drawn metal shell circumscribing the full complement of beaded rollers, the rollers including a plurality of uniformly spaced nodes, with the nodes being disposed in the grooves in the outer race whereby the bearing assembly supports radial and axial loads.

A further object of this invention is to provide a new and novel method of forming a full complement bearing assembly comprising the steps of placing an inner race and a full complement of rollers within an outer race forming member, and then shaping the outer race forming member to conform to the rollers.

A still further object of this invention is to provide a new and novel method of forming a full complement bearing assembly comprising the steps of providing an inner race having uniformly spaced grooves therein, circumscribing the inner race with a full complement of beaded rollers, placing the inner race and the beaded rollers within an outer race forming member, and shaping the outer race forming member to conform to the rollers.

With the above and other objects in view that will hereinafter appear, the nature of the invention will be more clearly understood by reference to the following detailed description, the appended claimed subject matter and the several views illustrated in the accompanying drawing:

In the drawing:
FIGURE 1 is an axial end view of a full complement roller radial thrust bearing assembly which is constructed in accordance with the present invention.

FIGURE 2 is a fragmentary sectional view with parts broken away to illustrate details of the novel bearing assembly.

FIGURE 3 is an axial end view of the bearing assembly, in a partially assembled condition, and shows the outer race forming member prior to a final shaping operation.

FIGURE 4 is a cross-sectional view and illustrates the novel bearing assembly in a partially assembled condition.

FIGURE 5 is a cross-sectional view, similar to FIGURE 4, and illustrates the bearing assembly subsequent to the outer race forming member being shaped to conform to the full complement of beaded rollers by a shaping roll or swaging member.

Referring to the drawing in detail, there is shown a bearing assembly, generally indicated by the numeral 10, which consists of an inner race 11, an outer race 12 and a plurality of rollers 13.

Each of the rollers 13 has a beaded configuration and includes a series of uniformly spaced nodes 14 formed by alternating concave portions 15 and convex portions 16. The concave portions 15 have a radius of curvature, indicated by the arrow 17, and the convex portions 16 have a radius of curvature, indicated by the arrow 18. It is preferable, but not limited thereto, that the radius of curvature 17 and the radius of curvature 18 are in the ratio of 1:2, and the portions 15 and 16 have a point of tangency as at 19.

The inner race 11 is of a cylindrical tubular form and has a series of grooves 20 formed in its outer circumference 21 by a plurality of spaced peaks 22 and a plurality of spaced valleys 23. It is apparent, that in the bearing assembly 10, the peaks 22 of the inner race 11 cooperate with the concave portions 15 of the rollers 13, while the convex portions 16 of the rollers 13 cooperate with the valleys 23 of the inner race 11.

The outer race 12 is formed from a thin drawn metal shell or outer race forming member 25, as is shown in FIGURES 3 and 4, and includes a plurality of spaced grooves 26 formed in the inner circumference 27 and including a series of alternately spaced peaks 28 and valleys 29. It is apparent, from FIGURE 2, that the grooves 26 and the rollers 13 are designed such that the peaks 28 of the outer race 12 cooperate with the concave portions 15 of the rollers 13, and the valleys 29 of the outer race 12 cooperate with the convex portions 16 of the rollers 13.

The manner in which the bearing assembly 10 is assembled will be apparent from a consideration of FIGURES 3, 4 and 5. The plurality of rollers 13 are properly positioned with respect to the grooves 20 in the inner race 11, after which the inner race 11 and rollers 13 are inserted within the shell or outer race forming member 25, as is shown in FIGURE 4. After the thin metal shell or outer race forming member 25 has been assembled over the inner race 11 and rollers 13, the outer race forming member 25 is shaped, either by a rolling or forging or swaging operation, by utilizing a shaping member 30 which is shown fragmentarily in FIGURE 5.

It will be apparent from the foregoing that there has been provided a novel full complement roller radial thrust bearing assembly which consists of an outer race, an inner race and a full complement of beaded rollers. The bearing assembly is particularly useful in that it will support radial and axial thrust loads. In addition, the beaded configuration of the rollers provides for a considerable increase in contact area between the races and the rollers and thereby results in a lower pressure per unit area for a given length of roller. Further, such a bearing assembly prevents inadvertent axial displacement of the inner and outer races relative to each other and relative to the rollers. Also, as is shown in FIGURE 2, surface contact between adjacent rollers is substantially reduced, when compared with conventional cylindrical roller bearings, thus substantially reducing frictional losses resulting from sliding contact between adjacent rollers. In addition, substantial manufacturing economies are effected in the production of the above-described bearing assemblies because of the low cost of shaping the outer race 12, as compared to forming the grooves in the inner circumference of the outer race by a conventional grinding operation.

While a preferred form of bearing assembly, and a preferred method of assembling the same is disclosed in detail herein, it is to be clearly understood that variations in the disclosure of these method steps and part arrangements may be made without departing from the spirit and scope of the invention, as defined in the appended claimed subject matter.

I claim:

A full complement roller radial thrust bearing assembly comprising an outer race and an inner race, a full complement of beaded rollers disposed between said outer and inner races, said inner race having an outer surface with grooves formed therein for cooperating with said beaded rollers, said outer race having an inner surface with grooves formed therein for cooperating with said beaded rollers, said outer race comprising a thin malleable metal shell circumscribing said full complement of beaded rollers, said rollers including a plurality of uniformly spaced nodes, said nodes being disposed in said grooves in said outer race whereby said bearing assembly supports radial and axial loads, said outer race having an outer surface which is uniformly undulating along its longitudinal extent so as to conform in profile to said uniformly spaced nodes of said rollers.

References Cited by the Examiner
UNITED STATES PATENTS

| | | | |
|---|---|---|---|
| 881,471 | 3/1908 | Hoffmann | 29—148.4 |
| 2,273,895 | 2/1942 | Roterberg | 308—234 |
| 2,584,652 | 2/1952 | Ablett | 308—234 |
| 2,910,765 | 11/1959 | Heim | 29—148.4 |
| 2,928,702 | 3/1960 | Pitner | 308—236 |

MARTIN P. SCHWADRON, *Primary Examiner.*

FRANK SUSKO, *Examiner.*

DAVID J. WILLIAMOWSKY, *Assistant Examiner.*